United States Patent [19]

Schulte et al.

[11] 4,017,964
[45] Apr. 19, 1977

[54] METHOD OF MANUFACTURING ELECTRICAL MACHINERY HAVING A ROTOR

[75] Inventors: Siegfried Schulte, Gevelndorf; Wilheim Schmitt, Ringenberg, both of Germany

[73] Assignee: Firma Schulte Elektrotechnik KG, Luedenscheid, Germany

[22] Filed: Oct. 6, 1975

[21] Appl. No.: 619,794

[30] Foreign Application Priority Data

Oct. 12, 1974 Germany .......................... 2448699
May 28, 1975 Germany .......................... 2523604

[52] U.S. Cl. .............................. 29/596; 113/120 H; 310/42; 310/89; 310/90
[51] Int. Cl.² ........................................ H02K 15/14
[58] Field of Search .................. 29/596, 598, 609; 310/42, 89, 90; 113/120 H

[56] References Cited

UNITED STATES PATENTS

| 2,545,335 | 3/1951 | Becker | 310/89 X |
| 3,264,506 | 8/1966 | Carlson et al. | 29/596 X |
| 3,529,874 | 9/1970 | Hoddy | 310/89 X |
| 3,714,705 | 2/1973 | Lewis | 29/596 |

FOREIGN PATENTS OR APPLICATIONS 256,072  8/1963  Australia .......................... 310/89

*Primary Examiner*—Carl E. Hall
*Attorney, Agent, or Firm*—W. G. Fasse; W. W. Roberts

[57] ABSTRACT

An electrical machine, such as a motor or generator, with a rotor is manufactured by first deep drawing the housing as two separate members from sheet metal, such as steel sheet metal. As a result of the deep drawing, each housing member is provided with a bearing seating surface for the rotor bearing and at least one housing member is provided with a shoulder for the stator also as a result of the deep drawing. The parts of the machine are assembled by a press fit between the rotor bearings and the respective bearing seating surface and preferably also between the stator and at least one housing member. The housing members are secured to each other either by a press fit or by radially outwardly extending ears or lugs produced by said deep drawing.

10 Claims, 3 Drawing Figures

METHOD OF MANUFACTURING ELECTRICAL MACHINERY HAVING A ROTOR

BACKGROUND OF THE INVENTION

The present invention relates to a method of manufacturing electrical machinery having a rotor, more specifically, drive motors as are used in all technical fields. Thus, such motors and smaller generators are products of a typical mass production type and the features of such products must meet the design and structural requirements peculiar to mass production.

Conventional machinery of this type comprises a cast housing which receives the stator member and the excitation coil of the respective machine. It is also known to produce housings for this type of machine by welding the parts of a steel structure to each other. In any instance, the cylindrical inner space is taken up by the rotor carrying a cage winding or a squirrel cage winding. To support the rotor, the conventional housings of the cast or welded type comprise end shields which provide bearing seating surfaces for the bearings of the rotor shaft.

To assure a proper centering of the rotor shaft it is necessary to precisely machine the end shields and the lateral ends of the housing proper so as to center the end shields relative to the longitudinal central axis of the housing. This required machining constitutes a substantial expense, a factor which should be reduced as much as possible, especially for mass production items.

OBJECTS OF THE INVENTION

In view of the above, it is the aim of the invention to achieve the following objects singly or in combination:

to manufacture the housing for mass production electrical machines as simply as possible and as cheaply as possible while simultaneously assuring that an automatic centering of the rotor and stator relative to each other takes place as a result of the assembly of the elements of a machine;

to improve the mass to power ratio by reducing the weight of the housing for such electrical machines, especially motors;

to employ simpler manufacturing conditions than must be met in connection with casting and welding operations, such conditions are available in manufacturing parts by deep drawing and the invention takes advantage of deep drawing;

to manufacture the housing parts by deep drawing, preferably in a single manufacturing step without any subsequent machining;

to construct and manufacture the housing parts in such a manner that the assembly of the stator and rotor with its bearing inside the housing will automatically assure the precise positioning of the elements relative to each other without any preliminary operations or centering steps; and to provide the housing members simultaneously with their production by deep drawing with laterally extending ears or lugs, which will facilitate the interconnection of the housing elements to each other.

SUMMARY OF THE INVENTION

According to the invention there is provided a method for the mass production of electric motors and smaller generators by deep drawing the two housing members as two separate members from sheet metal, especially steel sheet metal whereby the deep drawing process provides the two housing members with the bearing seating surfaces and at least one of the housing members is provided with shoulder for the stator of the motor. The housing proper has a pot shape, the bottom of which has a configuration adapted to provide seating surfaces for the rotor bearing. Further, the pot shaped housing member is provided with a shoulder intermediate its ends against which the stator may rest. The other housing member is also produced by deep drawing and forms a cover for the pot shaped housing member whereby the cover is provided in the deep drawing with a bearing seating surface for the rotor bearing.

In one embodiment the pot shaped housing member is provided with a conically extending inner rim along its open end edge and the cover member is provided with an outer conical rim which fits with a force fit into the inner conical rim of the pot shaped housing member whereby upon assemblying the elements to each other an automatic centering of the rotor relative to the stator is accomplished, because the rotor bearings also fit with a press fit into the bearing seating surfaces provided in the bottom of the pot shaped housing member and in the cover member. The conical rims do not require any extra machining, since they are also produced as a result of the deep drawing. In the alternative, the cover may have an inner conical rim and the housing may have an outer conical rim.

In another embodiment the housing members are symmetrical relative to a central plane extending normal to the longitudinal axis of the motor. To this end the two housing members both have a pot shape and both are deep drawn from sheet metal, whereby the same tool may be used for both housing members. Each housing member is provided by the deep drawing with a seating surface for the bearing and with a shoulder for the stator. Simultaneously, each housing member is provided along its open end with radially outwardly extending ears or lugs also produced in the deep drawing process. The lugs are interconnected to each other, for example, by spot welding, riveting, or by nuts and bolts.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
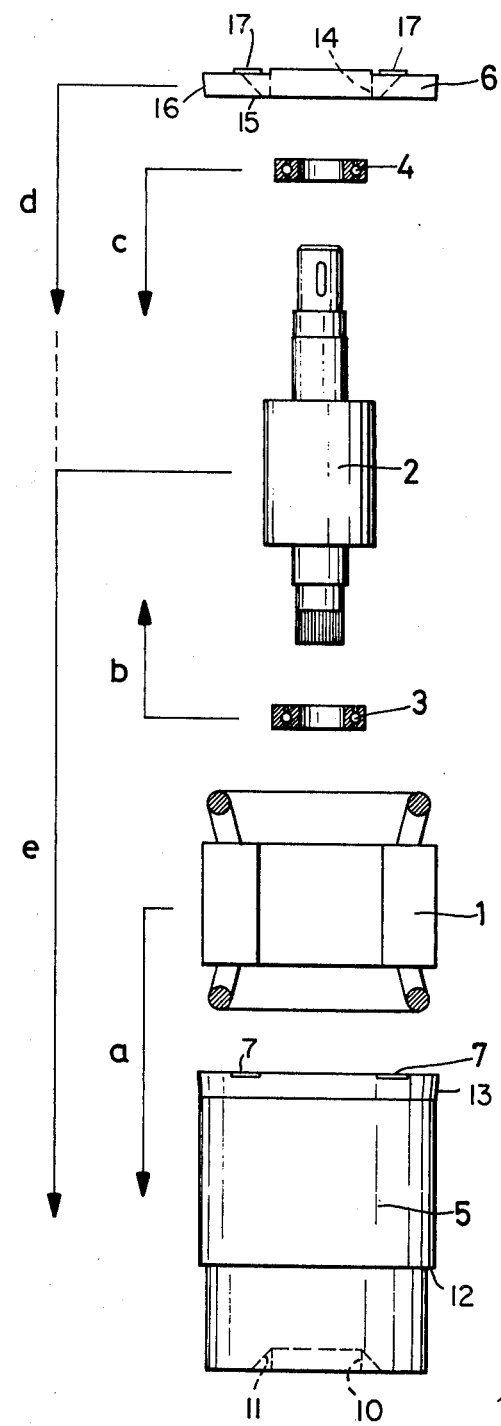
FIG. 1 is an exploded view illustrating the assembly of the elements in accordance with the method of the invention.

Referring to FIG. 1, two housing members are deep drawn from sheet metal, such as steel sheet metal. One housing member 5 has a pot shape and as a result of the deep drawing, is provided at its bottom with a bearing seating surface 10. Laterally extending ridges 11 circumferentially spaced around the seating surface 10 may be provided for reinforcing the seating surface 10. Conventional sheet metal deep drawing procedures may be employed to provide the housing member 5 with the just described bearing seating surface and reinforcements. A shoulder 12 is also produced as a result of the deep drawing. The shoulder may run all around the circumference of the housing member 5 or only at spaced circumferential intervals. In any event, the stator 1 with its winding is arranged to rest on the shoulder 12.

At the upper open end the housing member 5 is provided with an inwardly facing conical rim 13, which is also produced in the preferably single deep drawing step. In addition, the upper edge is provided with ears or lugs 7, three of which may be distributed about the circumference of the upper edge of the housing member 5.

The cover or housing member 6 is also produced by deep drawing, as a result of which it is provided with a bearing seating surface 14 with reinforcing ridges 15, as described with reference to the housing member 5. The cover 6 is provided with an outwardly facing conical rim 16, which fits into the inwardly facing rim 13 of the housing member 5. The cover 6 is further provided with ears or lugs 17 located to match the location of the ears or lugs 7.

For assemblying the motor, the stator 1 with its sheet metal lamination core is inserted into the housing member 5 to rest with its core against the shoulder 12. Preferably, the stator 1 is inserted into the housing member 5 with a press fit. The rotor 2 carrying, for example, a cage winding or a squirrel cage winding is then provided on its shaft with radial bearings 3 and 4. The rotor fits with its largest outer diameter through the clearance inside the stator 1. The rotor is then inserted with the outer race of its bearing 4 into the cover 6 so that the bearing is held with a press fit in the bearing seating surface 14. This subassembly comprising the rotor 2, the bearings 3 and 4, and the cover 6 is then inserted into the housing member 5, whereby the outer race of the bearing 3 fits into the bearing seating surface 10 with a press fit. Simultaneously, the conical outwardly facing rim 16 fits with a force or press fit into the inwardly facing conical rim 13, whereby the assembly is automatically centered. For smaller motors it would be sufficient to provide just the conical press fit between the rims 13 and 16, thus obviating any additional connecting elements. However, for additional securing the housing members to each other, the lugs 7 and 17 may be welded to each other or they may be riveted, or even glued to each other, for example, by means of well known two component epoxy glues.

Summarizing the foregoing, the present method produces in a first deep drawing step the housing members 5 and 6 as described. The assemblying then takes place as follows. Step (a): insert the stator 1 into the housing 5 preferably with a press fit so that the stator rests against the shoulder 12. Steps (b) and (c): attach the radial bearings 3 and 4 to the shaft of the rotor 2. Step (d): the bearing 4 is inserted with a press fit into the cover 6. Step (e): the sub-assembly comprising the rotor with its bearings and the cover 6 are then inserted with a press fit into the housing 5.

Figure 2:
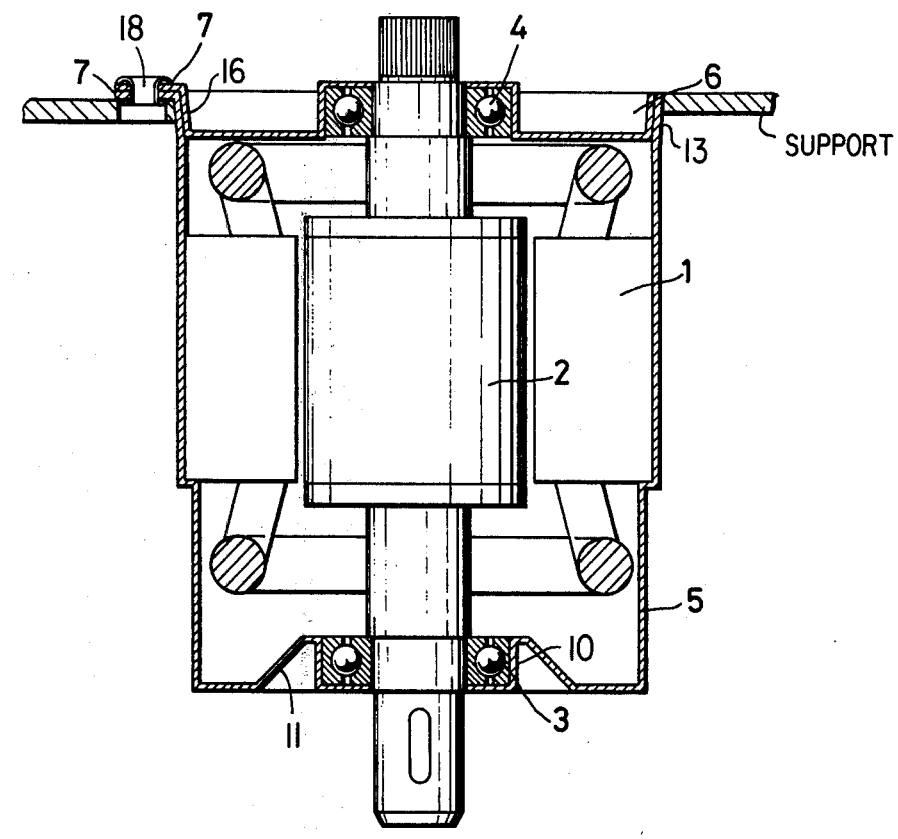
FIG. 2 illustrates the motor after it has been assembled.

FIG. 2 illustrates the completed motor, whereby the stator 1 is held in position by a press fit between the laminated core of the stator and the inner surface of the housing member 5. The conical cooperating rims 13 and 16 are produced as a result of the deep drawing step and do not require any additional machining. These rims 13, 16 automatically center the rotor relative to the stator.

For additional stability the lugs 17 and 7 shown in FIG. 2 are interconnected by hollow rivets 18. This feature has the additional advantage that the hole through the rivets 18 may be employed for securing the entire motor to a supporting chassis or the like at the location where it is to be used. However, if desired, the hollow rivets 18 may be replaced by other connecting means as mentioned above, for example, nuts and bolts, spot welding, or even glue.

Figure 3:
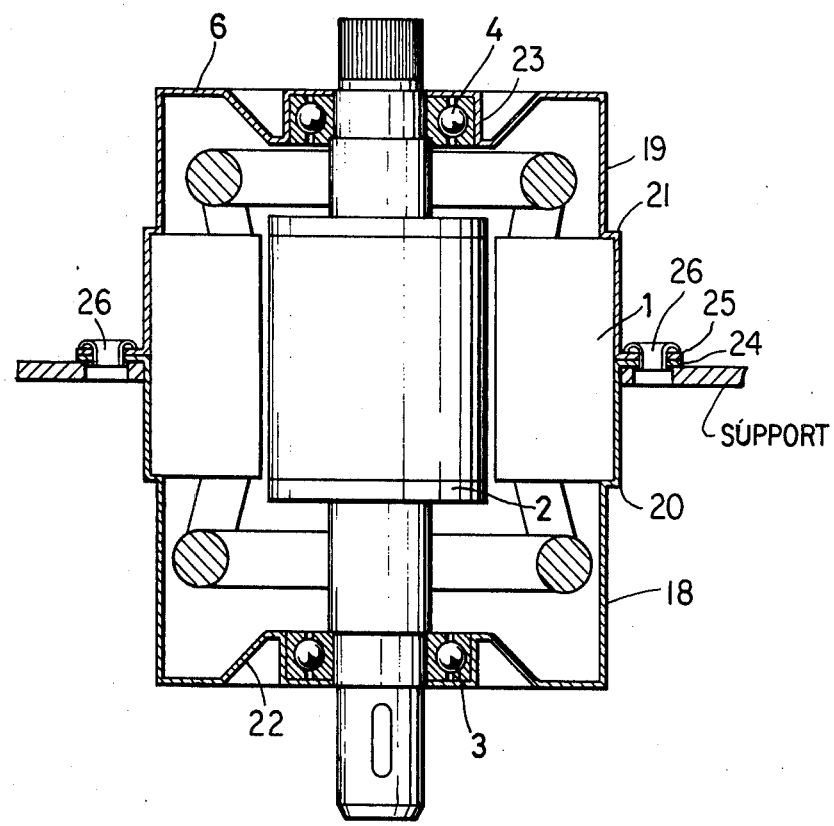
FIG. 3 illustrates a motor produced in accordance with a modified embodiment according to the invention, especially suitable for larger motors.

FIG. 3 illustrates a modification of the teaching according to the invention wherein two deep drawn housing members 18 and 19 are produced to be mirror-symmetrical relative to the central plane through the motor perpendicular to the longitudinal shaft of the motor. This type of deep drawn housing is suitable for even larger motors. The stator 1 is held between shoulders 20 and 21. Each housing member 18, 19 is provided with its respective shoulder and with the bearing seating surfaces 22, 23 in a deep drawing step. The stator 1 sits with a press fit in both housing members. As the housing members 18 and 19 are pressed onto the stator, the same pressure also moves the bearings 3 and 4 into the respective bearing seating surfaces 22, 23 with a press or force fit. As a result, again an automatic centering of all the parts relative to each other is accomplished.

Each housing member 18, 19 is provided with respective lugs 24, 25 and the housing members are connected to each other for additional safety by means of hollow rivets 26, which again have the advantage of providing holes for securing the motor to a supporting platform or the like.

Dividing the motor housing into two symmetrical halves, as described with reference to FIG. 3, will normally be sufficient to produce these housing members 18, 19 in a single deep drawing step. This feature of the invention of dividing the housing thus obviates producing the housing members in several deep drawing steps, which might otherwise be required together with intermediate anealing to remove any brittleness which might result due to cold working.

It has been found that the deep drawn housings according to the invention are much lighter than cast or welded housings of the prior art, whereby the mass to power output ratio has been substantially improved. Another advantage of the invention is seen in that the production and assembly steps have been greatly facilitated and simplified in comparison to prior art methods, whereby the present method is especially suitable for mass production purposes.

In connection with FIG. 3, it should be mentioned that the two housing halves are pressed simultaneously from opposite ends onto the stator rotor assembly, whereby the dimensions are such that gthe stator comes to rest on the shoulders 20, 21 at the same time when the bearings 3 and 4 have been properly located in the bearing seating surfaces 22, 23 whereby the above mentioned press fit in both instances assures the proper location and centering of the elements relative to each other.

The provision of the above described lugs 24, 25 or 7, 17 has the further advantage that other elements may be secured to the motor proper, for example, a ventilating housing may thus be combined with the motor proper. Similarly, a terminal panel or the like may be secured by means of these lugs.

Although the invention has been described with reference to specific example embodiments, it will be appreciated, that it is intended to cover all modifications and equivalents within the scope of the appended claims.

We claim:

1. A method of manufacturing an electrical machinery assembly including a rotor with a shaft, a stator having an inner bore of given diameter, a housing and bearing means having an outer diameter smaller than said stator bore diameter and supporting said rotor in said housing, comprising deep drawing said housing as two separate housing members from sheet metal, deep drawing in each of said housing members a respective bearing seating surface, deep drawing in at least one of the housing members a stator supporting shoulder, inserting said stator into said one housing member to rest against said shoulder, first placing said bearing means on said rotor shaft and then inserting the rotor with its bearings into said one housing member, aligning the one housing member with the other housing member and applying axially directed pressure to form the assembly whereby the bearing means are centered and seated on said bearing seating surfaces of said housing members, wherein said bearing seating surface and said shoulder in said one housing member are formed in a single deep drawing step, wherein said one housing member is provided, also by deep drawing, with a conical inner rim around its open end, and wherein the other housing member is provided with a matching conical outer rim fitting into said inner rim and securing said housing members to each other by pressing said rims together whereby said conical rims provide an automatic self-centering of the entire assembly.

2. The method according to claim 1, wherein said stator is inserted into said one housing member with a press fit.

3. The method according to claim 1, wherein said bearing means are seated on their respective seating surfaces with a force fit by the axially applied pressure.

4. The method according to claim 1, further comprising providing said housing members, by deep drawing, with radially outwardly extending connecting means for said securing.

5. The method according to claim 4, further comprising providing said connecting means with holes therethrough.

6. The method according to claim 1, further comprising providing said housing members, by deep drawing, with radially outwardly extending connecting means for said securing, and using said outwardly extending connecting means for attaching the complete assembly to support means.

7. A method of manufacturing an electrical machinery assembly including a rotor with a shaft, a stator having an inner bore of given diameter, a housing and bearing means having an outer diameter smaller than said stator bore diameter and supporting siad rotor in said housing, comprising deep drawing said housing as two separate housing members from sheet metal, deep drawing in each of said housing members a respective bearing seating surface, deep drawing in both housing members a stator supporting shoulder, inserting said stator into said one housing member to rest against said shoulder, first placing said bearing means on said rotor shaft and then inserting the rotor with its bearings into said one housing member, aligning the one housing member with the other housing member and applying axially directed pressure to form the assembly whereby the bearing means are centered and seated on said bearing seating surfaces of said housing members, said deep drawing providing said two housing members with substantially the same configuration each to form a half housing with its respective stator supporting shoulder and with its respective bearing seating surface, said axially directed pressure pressing said two half housing members from opposite ends onto the stator and rotor with its bearing means until the stator rests against both shoulders and the bearing means are held in their respective seating surface whereby said stator resting against said shoulders provides an automatic self-centering of the entire assembly.

8. The method according to claim 7, further comprising providing said housing members, by deep drawing, with radially outwardly extending connecting means for said securing.

9. The method according to claim 8, further comprising providing said connecting means with holes therethrough.

10. The method according to claim 7, further comprising providing said housing members, by deep drawing, with radially outwardly extending connecting means for said securing, and using said outwardly extending connecting means for attaching the complete assembly to support means.

* * * * *